United States Patent
Asco et al.

(10) Patent No.: US 6,516,346 B1
(45) Date of Patent: Feb. 4, 2003

(54) MICROCODE UPGRADE IN DATA PROCESSING SYSTEM

(75) Inventors: Amadeo Asco, Southampton (GB); Barry Douglas Whyte, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,591

(22) Filed: Aug. 18, 1999

(30) Foreign Application Priority Data

Feb. 19, 1999 (GB) ............................................. 9903727

(51) Int. Cl.[7] .......................................... G06F 15/177
(52) U.S. Cl. ...................................... 709/221; 717/178
(58) Field of Search ................................. 717/168, 171, 717/172, 173, 178, 118, 170; 709/203, 217, 218, 219, 221, 220, 222

(56) References Cited

U.S. PATENT DOCUMENTS

| | | | |
|---|---|---|---|
| 5,659,801 A | | 8/1997 | Kopsaftis ..................... 395/882 |
| 5,845,077 A | * | 12/1998 | Fawcett ....................... 709/221 |
| 5,867,714 A | * | 2/1999 | Todd et al. ..................... 707/10 |
| 6,021,276 A | * | 2/2000 | Demke et al. ............... 717/178 |
| 6,074,434 A | * | 6/2000 | Cole et al. ................... 717/170 |
| 6,167,567 A | * | 12/2000 | Chiles et al. ................ 709/221 |
| 6,199,194 B1 | * | 3/2001 | Wang et al. ................. 717/118 |
| 6,314,565 B1 | * | 11/2001 | Kenner et al. .............. 717/170 |

FOREIGN PATENT DOCUMENTS

| | | |
|---|---|---|
| EP | 0 284 924 | 10/1988 |
| WO | WO 95/04355 | 2/1998 |

* cited by examiner

*Primary Examiner*—Patrice Winder
(74) *Attorney, Agent, or Firm*—Robert P. Tassinari

(57) ABSTRACT

A method for providing the automatic upgrade of microcode on a computer system connected to a remote system comprises executing a software tool on the computer system to determine the level of the current microcode on the system. The information on the current microcode level and associated system configuration information is sent automatically to the remote system where the microcode level and configuration information are checked against a database. On a determination that the current microcode level is not the latest level, the user of the computer system is notified that a more recent level is available and in response to a request by the user, the more recent microcode level is downloaded from the remote system. The user can then upgrade the microcode in the system.

19 Claims, 3 Drawing Sheets

MICROCODE UPGRADE IN DATA PROCESSING SYSTEM

FIELD OF THE INVENTION

The present invention relates generally to the management of data processing systems in a network and more specifically to the automatic updating of microcode in such systems.

BACKGROUND OF THE INVENTION

Data processing systems typically include various hardware elements that have microcode (alternatively called firmware) associated therewith. One example of such an element is a storage adapter that provides the capability to attach a data storage subsystem such as a RAID array to the data processing system. In addition to various hardware components including processor and memory, the adapter is provided with microcode in memory to control the operation of the adapter to transfer data between the data processing system and storage subsystem.

In many modern systems of this type, the microcode is stored in programmable memory and it is thus possible to upgrade the microcode from the level which was originally provided with the system. This allows for bug fixes to be readily implemented and also allows the provision of extra functionality to the system without the need to change the hardware. Typically these microcode upgrades are provided to the user of the system on some form of storage medium, for example disk or tape, and the user copies the upgrade to the system and then stores the upgrade in the programmable memory. More recently, upgrades have been made available via the Internet thus allowing the user more convenient access to the upgrade microcode.

Although this latter technique is relatively efficient, it requires the user of the system (who may be a network administrator in charge of many systems with differing hardware configurations) to remember details of Internet addresses (which may change) for the microcode supplier, to find the correct location for the upgrade code and to finally download it onto the system to be upgraded. It would be desirable to provide an improved technique that makes the upgrade process more user friendly.

DISCLOSURE OF THE INVENTION

According to a first aspect of the invention there is provided a method for facilitating the upgrading of microcode on a computer system, the method comprising: determining the current level of microcode on the computer system and associated system configuration information; sending the information on the current microcode level and associated system configuration information to a remote system connected for communication to the computer system; at the remote system, checking the current microcode level and configuration information against a database associated with the remote system; and on a determination that the current microcode level is not the latest level, notifying the user of the computer system that a more recent level is available and, in response to a request by the user, transmitting the more recent microcode level for storage on the computer system.

According to a second aspect of the present invention, there is provided apparatus for facilitating the automated upgrading of microcode on a data processing system connected for communication with a remote computer system, the apparatus comprising: means for determining the current level of microcode on the data processing system and for communicating information on the current microcode level and associated system configuration information to the remote system; means, responsive to a message from the remote system that a more recent microcode level is available, for notifying the user of the computer system that a more recent microcode level is available and, responsive to a user request, to download the more recent microcode level from the remote system.

As will be described below, the user of the computer system is thus enabled to check on the status of the microcode in the computer system by invoking a software tool to collate details of the current microcode level and associated system configuration information (for example, hardware ID, operating system information) and to send the collated information to a remote system where the microcode level is checked against a database. If the microcode is not the latest level then the user of the computer system is so notified and is given the opportunity to download the latest level for installation on the computer system. Advantageously, the computer system and remote system are connected to communicate over the Internet. Thus when the computer system user is notified that a more recent microcode level is available, the notification also includes an Internet address (or several alternative addresses) from which the latest microcode can be downloaded.

In a preferred method and apparatus, the notification to the user of the computer system that a more recent microcode level is available includes presenting a web page hyperlink to the location from which the more recent microcode level can be downloaded. Alternatively, the notification includes presenting the user with a hyperlink to a software licence agreement relevant to the more recent microcode and downloading the more recent microcode is made conditional on user acceptance of the terms and conditions of the software licence agreement In accordance with the present invention, the computer system user who wishes to upgrade system microcode does not have to waste time finding web sites and support areas to determine whether the current microcode is the latest version nor does the user have to waste time finding and downloading the new code. In addition, the microcode supplier will be more able to disseminate new improvements and enhancements to microcode.

A preferred embodiment of the present invention will now be described, by way of example only, with reference to the accompanying drawing.

DESCRIPTION OF THE PREFERRED EMBODIMENT

Figure 1:
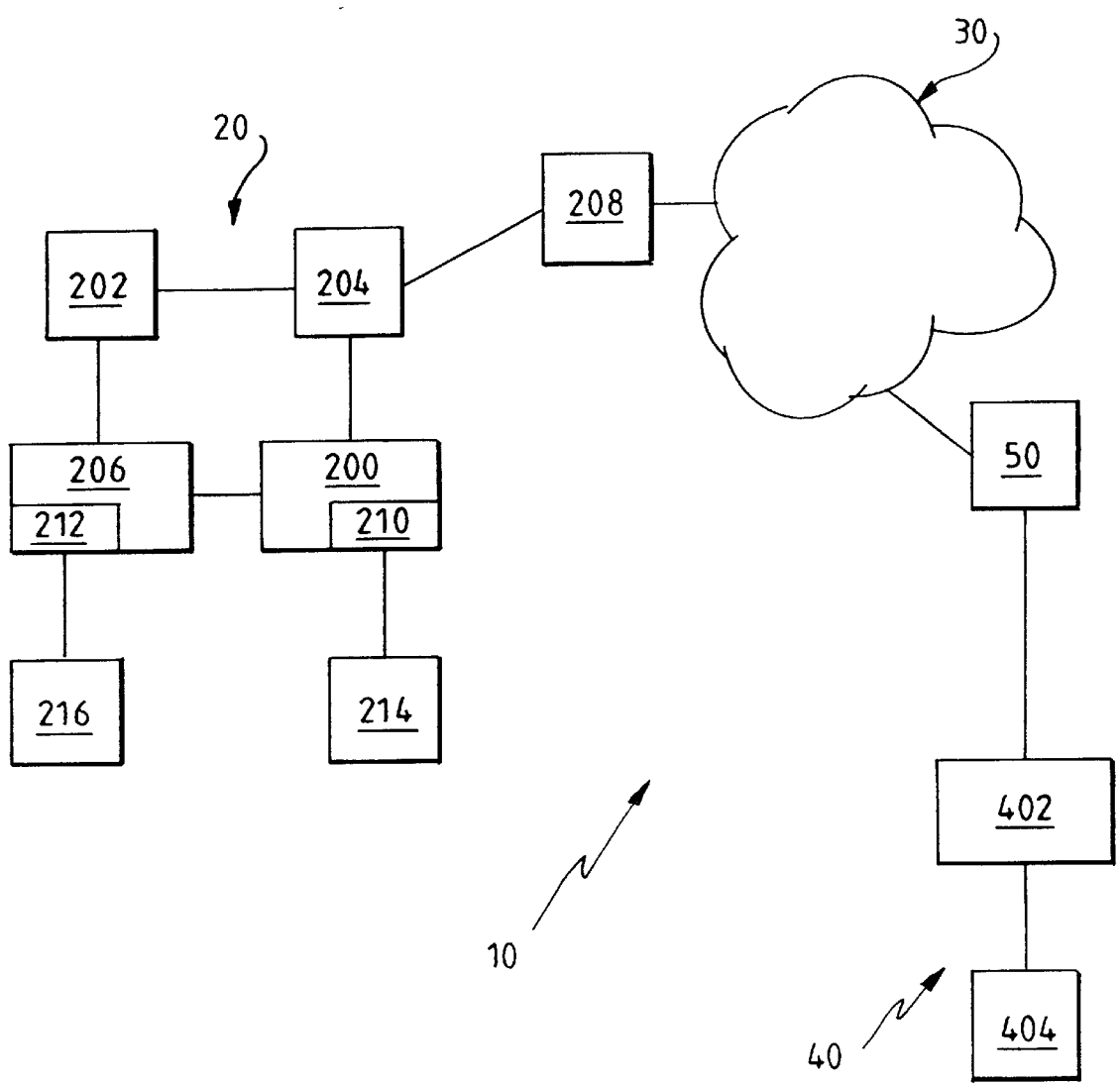
FIG. 1 shows a wide area network in which the preferred embodiment of the invention may be employed.

With reference first to FIG. 1, there is shown a wide area data processing network 10 comprising a local network 20 connected via the Internet 30 to a remote server 40. The local network comprises a group of interconnected computer systems 200,202,204,206 (e.g. personal computers, workstations, servers and the like) that are connected to the Internet via a proxy server 208 which acts as a firewall to prevent unauthorised third party access to the local network. As shown in FIG. 1, each of two of the connected computer systems 200,206 includes a storage adapter 210,212, located within the computer system, and an external data storage subsystem 214,216 that may advantageously be configured as a storage array according to one or more levels of the RAID architecture. In the preferred embodiment of the invention the local area network is configured as a loop according to the Serial Storage Architecture (SSA) standard as defined by ANSI. The invention may however be used with other architectures such as Fiber Channel (FC-AL).

The remote server 40 includes a system unit 402 that is attached to the Internet via a firewall 50 and has associated therewith a database 404 that is either directly connected to the server or is otherwise accessible to the server.

Figure 2:
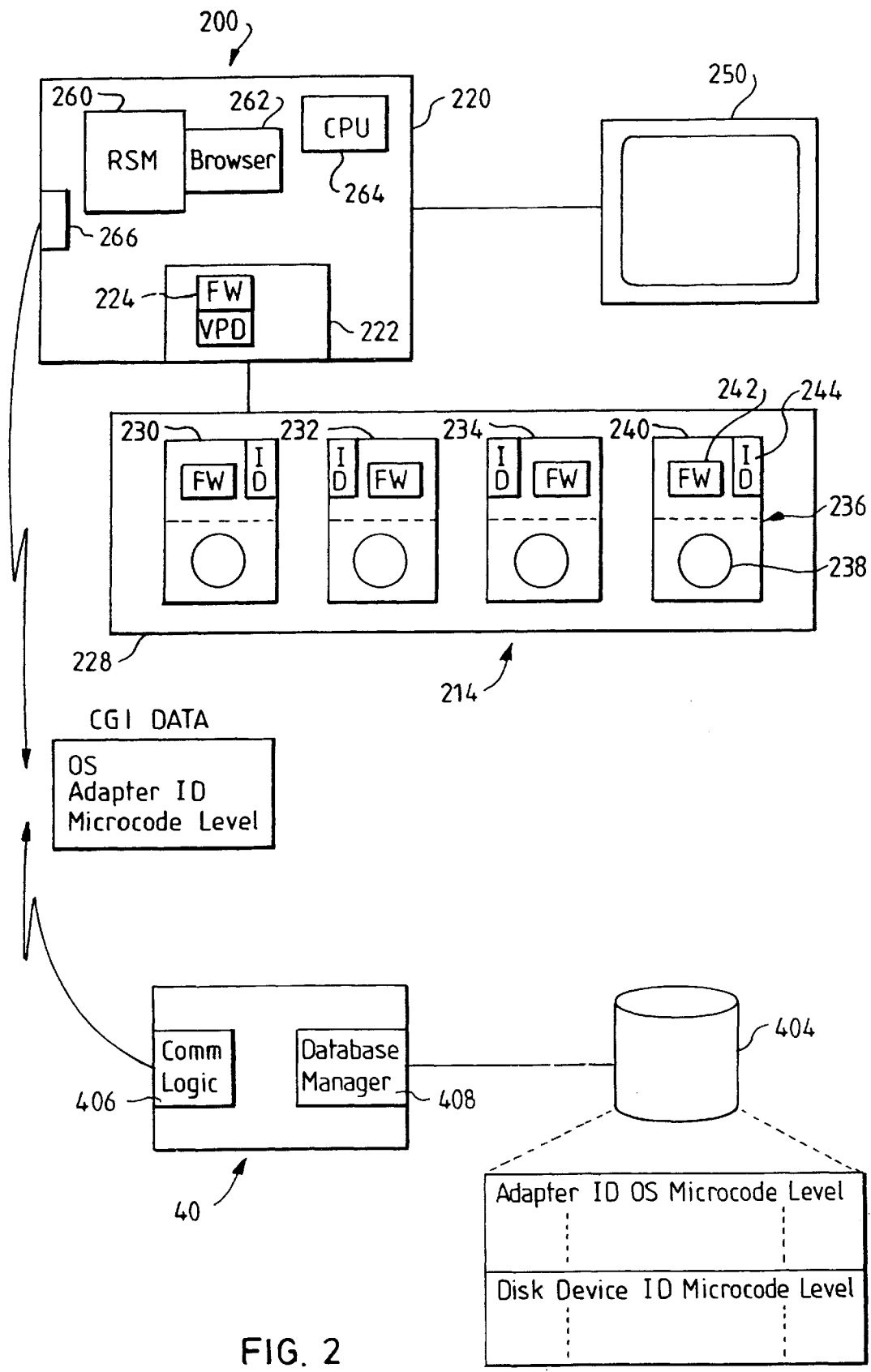
FIG. 2 is a schematic illustration of a local computer system connected to a remote system according to a preferred embodiment of the present invention.

Referring next to FIG. 2 there is shown one of the local computer systems 200 of FIG. 1 and the remote computer system 40. The local system includes a system unit 220 in which is mounted a pluggable storage adapter card 222. The adapter card includes a programmable memory (EPROM) 224 in which is stored the adapter microcode and also the Vital Product Data (VPD) for the adapter. The VPD specifies the type of adapter (adapter ID) and the level of microcode currently running on the adapter. Although not shown for clarity, the adapter also includes other hardware components such as processor and other memory that are used in controlling the transfer of data between the local system and the storage devices. Attached to the adapter is a storage subsystem 214 including an enclosure 228 in which are mounted four disk storage devices 230,232,234,236. Each device includes one or more head disk assemblies 238 and a disk controller 240 including device microcode stored in programmable memory 242 and device ID information 244 which may alternatively be stored in the programmable memory 242.

The local system of FIG. 2 further includes a display 250 attached to the system unit and a remote systems manager (RSM) code 260 which when not being executed on the local system may be stored on one or more of the disk storage devices. The RSM provides a number of different management and service tools to the user of the local system, one of which, in accordance with the preferred embodiment of the present invention, allows the user to check the configuration of the disk storage devices and storage adapter(s) attached to the local system and to determine in an automated and user friendly manner whether the microcode used in the adapter(s) and storage devices is the latest level. The RSM includes a web browser interface 262 that presents the user of the local system with information via web pages. When invoked (either automatically or by a user of the local system), the RSM runs on the local system CPU 264 and displays the web pages on the display. The local system further includes a network card 266 for providing communication with other systems in the network and also with the remote server via the Internet.

The remote server 40 includes communication logic 406 for communicating with the local system over the Internet and a database manager 408 for controlling the transfer of data to and from the database 404. Other logic components of the server such as memory, processing logic etc. are well known in the art and are omitted from FIG. 2 for the sake of clarity.

According to the preferred embodiment of the present invention, the database includes entries identifying the latest microcode levels for particular storage adapter IDs and operating system configurations and also for disk storage device Ids. Copies of the various adapter and storage device microcodes are also stored on the database so as to be accessible to the remote server for transfer to the local computer system.

Figure 3:
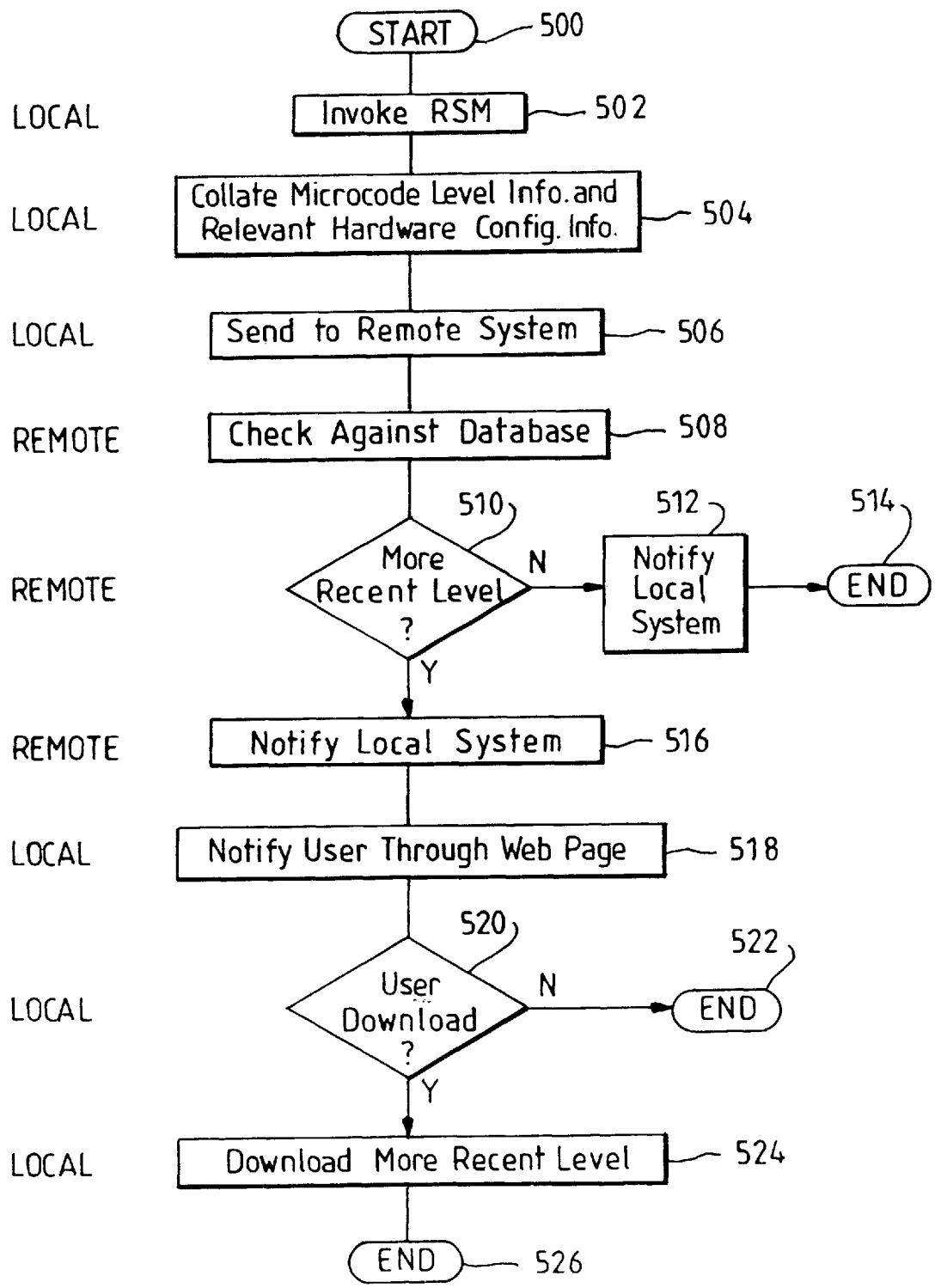
FIG. 3 is a flow diagram of the microcode upgrade process of the preferred embodiment of the present invention.

Next will be described the adapter microcode upgrade process according to the preferred embodiment of the invention with reference to FIGS. 2 and 3. It will be appreciated that an analogous process will operate to facilitate the upgrade of storage device microcode.

The process starts at step 500. When the user of the local system makes the decision to check whether the current level of adapter microcode is current, the RSM is invoked at step 502. At this point, the user is presented (via a web page) with information identifying the hardware configuration of the system including details of the adapter(s) provided in the system unit and any attached disk storage subsystems.

At step 504, the user interacts with the web page to select one of the identified adapters, for example by double clicking on an icon representing the adapter. This causes the RSM to collate information relevant to the selected adapter including details of the current level of microcode resident in the programmable memory on the adapter, adapter ID information and also information on the operating system executing on the local system. The information is collected by issuing a command to the adapter which requests the Vital Product Data (including the adapter ID information and the current microcode level) from the EPROM 224. Information on the operating system currently executing on the system is also obtained. The collated information is packaged by the RSM as cgi data and at step 506 is transmitted over the Internet to the remote server at the specified Internet address.

At step 506, the remote system receives the packaged data and invokes a program to check the data against that held on the database. In one embodiment, the remote server searches the database for the operating system and adapter ID information specified in the data and establishes which is the most recent level of microcode for this combination of operating system and adapter ID. At step 508, the most recent level indicated on the database is checked against the microcode level specified in the data received from the local system. If at step 510, it is established that the specified level is the most recent level, then the remote server sends, at step 512, notification to the local server to this effect. If the local system user does not wish to check for possible upgrades to other microcode then the process ends at step 514.

If, at step 510, it is established that the specified microcode level is not the most recent, then the remote server notifies the local server of this fact at step 516. In one embodiment, the local system user is presented with a hyperlink to the download location(s) (at step 518) as specified in the notification from the server. It will be noted that the specified download location is not necessarily the address of the remote server but may instead be a location closer to, or otherwise more suitable for, the particular local system. In the preferred embodiment however, the notification from the remote system is presented to the local system user as a hyperlink to a software licence agreement that includes terms and conditions relating to the use of the most recent microcode level.

Information may also provided about how the upgrade is to be performed on receipt of the latest microcode from the remote system. The downloading of the most recent microcode level is then made conditional on user acceptance of the licence agreement. If, at step 520, the user decides not to accept the terms and conditions of the software licence agreement (e.g. by clicking on a 'DISAGREE' button presented on the web page), then the process ends at step 522.

If, at step 520, the user accepts the software licence agreement (for example by clicking on an 'I AGREE' button presented on the web page), then the most recent level is downloaded from the remote system at step 524 for storage on the storage subsystem. The user can then apply the microcode upgrade when convenient. In an alternative arrangement, the user can be presented with the additional option to download to the storage subsystem and to automatically apply the upgrade. Again assuming that the user does not require further upgrades, the process ends at step 526.

Thus has been described a process and apparatus for facilitating the upgrade of microcode on one computer system of a local network. In order to upgrade microcode on other systems in the local network, separate instances of the RSM can be provided on each system. Alternatively, the RSM on one system of the local network can issue commands to the other local systems to collate adapter/disk microcode information.

In a further embodiment of the present invention, the browser interface of the RSM allows the user to check whether the level of RSM code, Device Drivers and other software (e.g. event logger) being used is current. In a manner analogous to the process described above, the current level of the RSM code is transmitted to a server where it is checked against a database. If not the latest level, the local system user is given the opportunity to download the latest version. Again, the software download may be made conditional on the user acceptance of certain licence terms and conditions.

Although the preferred embodiment of the invention has described as the interaction between a local system and a single remote system (corresponding to a single supplier of the microcode), it will be appreciated that the invention may also be employed where the different hardware components of the local system include microcode from different suppliers. In this case, the apparatus and method of the present invention will either provide a single RSM that links to different servers corresponding to the different microcode suppliers or will alternatively provide separate RSMs (or separate components within a single RSM) to facilitate the upgrading of microcode from the different suppliers.

Furthermore, although the preferred embodiment of the invention has been described in relation to adapter and storage device microcode it will be appreciated that the invention may, in principle, also be used in the upgrade of other microcodes, for example the BIOS on the system motherboard or on a graphics card. In addition, the invention may be used to upgrade the microcode in a storage enclosure for example in the case where the enclosure includes a storage controller as is often the case in the Fiber Channel architecture.

While the invention has been described in terms of a preferred embodiment, those skilled in the art will recognise that the invention can be practised with modification within the spirit and scope of the appended claims.

What is claimed is:

1. A method for facilitating the upgrading of microcode on a computer system, the method comprising:
    determining the current level of microcode on the system and associated system configuration information, including at least information about hardware with which the microcode is associated;
    sending the information on the current microcode level and the associated system configuration information to a remote computer system connected for communication to the local system;
    checking, at the remote system, the current microcode level and the associated system configuration information against a database associated with the remote system;
    on a determination that the current microcode level is not the latest level, notifying the user of the computer system that a more recent level is available and transmitting the more recent microcode level for storage on the computer system.

2. A method as claimed in claim 1 wherein the computer system and remote computer system are connected via the Internet and the steps of determining the current microcode level and sending the information to the remote server are implemented as a software tool that presents a web browser interface to the user.

3. A method as claimed in claim 2 wherein the step of notifying the user of the computer system that a more recent microcode level is available includes presenting a hyperlink to the location from which the more recent microcode level can be downloaded.

4. A method as claimed in claim 2 wherein the step of notifying the user of the computer system that a more recent microcode level is available includes presenting a hyperlink to a software licence agreement relevant to the more recent microcode, the method further comprising making the download of the more recent microcode conditional on user acceptance of the terms and conditions of the software licence agreement.

5. A method as claimed in claim 2, further comprising:
    checking the level of the software tool;
    sending information on the current software tool level to the remote system;
    checking the current software tool level against a database associated with the remote system;
    on a determination that the current software tool level is not the latest level, notifying the user of the computer system that a more recent level is available and, in response to a request by the user, transmitting the latest software tool level for storage on the computer system.

6. A method as claimed in claim 1, wherein the computer system includes a storage adapter and the step of determining the current level of microcode includes determining the level of storage adapter microcode.

7. A method as claimed in claim 6, wherein the computer system includes a plurality of storage devices connected to the storage adapter and the step of determining the current level of microcode includes determining the level(s) of storage device microcode.

8. A method as claimed in claim 1, wherein the associated system information further includes information about the operating system of the computer system.

9. Apparatus for facilitating the automated upgrading of microcode on a data processing system connected for communication with a remote computer system, the apparatus comprising:
    means for determining the current level of microcode on the data processing system and for communicating information on the current microcode level and associated system configuration information, including at least information about hardware with which the microcode is associated, to the remote system;
    means, responsive to a message from the remote system that a more recent microcode level is available, for notifying the user of the computer system that a more recent microcode level is available and for receiving the more recent microcode level from the remote system or other computer system specified by the remote system.

10. Apparatus as claimed in claim 9, wherein the means for notifying the user of the computer system includes a web browser for presenting a web page including a hyperlink to the location at the remote or other computer system from which the more recent microcode level can be downloaded.

11. Apparatus as claimed in claim 9, wherein the means for notifying the user of the computer system includes a web browser for presenting a web page including a hyperlink to a software licence agreement relevant to the more recent microcode level, wherein downloading of the more recent microcode level is made conditional on user acceptance of the terms and conditions of the licence agreement.

12. Apparatus for upgrading microcode on a data processing system connected for communication with a remote computer system, the apparatus comprising:

means for determining the current level of microcode on the data processing system and for communicating information on the current microcode level and associated system configuration information, including at least information about hardware with which the microcode is associated, to the remote system;

means at the remote system for checking the current microcode level and the associated system configuration information against a database associated with the remote system;

means operable on a determination that the current microcode level is not the latest level, to notify the user of the data processing system that a more recent level is available and, responsive to a request by the user, to transmit the more recent microcode level for storage on the data processing system.

13. Apparatus as claimed in claim 12 wherein the data processing system and remote computer system are connected for communication over the Internet and the means for determining the current microcode level and for communicating information to the remote system and the means for notifying the user are implemented as a software tool including a web browser user interface.

14. Computer program product comprising a computer usable medium having computer readable program code means embodied in the medium for facilitating the upgrading of microcode on a data processing system connected for communication with a remote computer system, the computer readable code means comprising:

code means for determining the current level of microcode on the data processing system and for communicating information on the current microcode level and associated system configuration information, including at least information about hardware with which the microcode is associated, to the remote system;

code means, responsive to a message from the remote system that a more recent microcode level is available, for notifying the user of the computer system that a more recent microcode level is available and, responsive to a user request, to download the more recent microcode level from the remote system.

15. A method for facilitating the upgrading of microcode on a computer system, the method comprising:

determining the current level of microcode on the computer system and associated system configuration information;

sending the information on the current microcode level and the associated system configuration information to a remote computer system connected for communication to the local system;

checking, at the remote system, the current microcode level and the associated system configuration information against a database associated with the remote system; and on a determination that the current microcode level is not the latest level, notifying the user of the computer system that a more recent level is available and transmitting the more recent microcode level for storage on the computer system;

wherein the computer system includes a plurality of hardware devices connected thereto and the step of determining the current level of microcode includes determining the level(s) of hardware device microcode.

16. The method as claimed in claim 15, wherein said plurality of hardware devices includes storage devices and the step of determining the current level of microcode includes determining the level(s) of storage device microcode.

17. The method as claimed in claim 15, wherein said plurality of hardware devices are connected to the computer system by a hardware adapter and the step of determining the current level of microcode includes determining the level of hardware adapter microcode.

18. The method as claimed in claim 15, wherein said plurality of hardware devices includes storage devices connected to the computer system by a storage adapter, and the step of determining the current level of microcode includes determining the level(s) of storage device microcode.

19. The method as claimed in claim 18, wherein the step of determining the current level of microcode includes determining the level of storage adapter microcode.

* * * * *